United States Patent [19]
Popovich

[11] Patent Number: 6,101,008
[45] Date of Patent: Aug. 8, 2000

[54] AUTOSTEREOSCOPIC DISPLAY BASED ON ELECTRICALLY SWITCHABLE HOLOGRAMS

[75] Inventor: Milan M. Popovich, Leicester, United Kingdom

[73] Assignee: DigiLens, Inc., Sunnyvale, Calif.

[21] Appl. No.: 09/350,797

[22] Filed: Jul. 9, 1999

Related U.S. Application Data

[60] Provisional application No. 60/104,583, Oct. 16, 1998.

[51] Int. Cl.$^7$ ........................................................ G02B 5/32
[52] U.S. Cl. ................................ 359/15; 359/22; 359/23; 359/32; 359/33; 359/462; 359/464; 359/472; 349/201; 349/202; 353/7; 348/42; 348/51; 348/54
[58] Field of Search ..................................... 359/15, 22, 23, 359/32, 33, 462, 464, 472; 349/201, 202; 353/7; 348/42, 51, 54

[56] References Cited

U.S. PATENT DOCUMENTS

| | | | |
|---|---|---|---|
| 4,799,739 | 1/1989 | Newswanger | 350/3.7 |
| 4,957,351 | 9/1990 | Shioji | 359/462 |
| 5,111,313 | 5/1992 | Shires | 359/17 |
| 5,521,724 | 5/1996 | Shires | 359/22 |
| 5,528,402 | 6/1996 | Parker | 359/87 |
| 5,731,853 | 3/1998 | Taketomi et al. | 349/15 |
| 5,745,203 | 4/1998 | Valliath et al. | 349/113 |
| 5,764,317 | 6/1998 | Sadovnik | 349/5 |
| 5,790,284 | 8/1998 | Taniguchi | 359/15 |
| 5,801,793 | 9/1998 | Faris et al. | 349/5 |
| 5,825,448 | 10/1998 | Bos et al. | 349/128 |
| 5,831,698 | 11/1998 | Depp et al. | 349/64 |
| 6,014,187 | 9/1990 | Taketomi | 359/23 |

FOREIGN PATENT DOCUMENTS

| | | | |
|---|---|---|---|
| WO 97/35223 | 9/1997 | WIPO | G02B 27/01 |
| WO 98/04650 | 2/1998 | WIPO | C09K 19/00 |

*Primary Examiner*—Cassandra Spyrou
*Assistant Examiner*—Leo Boutsikaris
*Attorney, Agent, or Firm*—Law Offices of Terry McHugh; Thomas H. Ham

[57] ABSTRACT

An autostereoscopic display system and a method of displaying a scene in a stereoscopic form on a screen of the system include two or more reconfigurable holographic optical element (HOE) stacks in the screen. The reconfigurable HOEs may be configured to perform simple optical functions that are commonly associated with traditional optical devices, such as lenses, prisms and mirrors. However, the reconfigurable HOEs may also be configured to perform sophisticated optical manipulations, such as optimally diffusing light with respect to light intensity toward a predefined viewing region. Each reconfigurable HOE includes a hologram that is sandwiched between two electrode layers. The hologram is a holographic photopolymeric film that has been combined with liquid crystal. The hologram has an optical property that changes in response to an applied electrical field. The reconfigurable HOE stacks are utilized to optimally diffuse monochromatic images projected from an image generator to one or more observers, such that the observers can view the scenes displayed on the screen in a stereoscopic form. Each reconfigurable HOE stack includes three reconfigurable HOEs to sequentially diffuse the monochromatic images of the tristimulus colors. The number of reconfigurable HOE stacks included in the screen depends on the maximum number of observers that can be accommodated by the system. The system may include one or more imaging devices to detect the presence of observers and to determine their locations, so that only pertinent images are projected and diffused by the system.

20 Claims, 5 Drawing Sheets

AUTOSTEREOSCOPIC DISPLAY BASED ON ELECTRICALLY SWITCHABLE HOLOGRAMS

This application claims the benefit of U.S. provisional application Ser. No. 60/104,583, filed Oct. 16, 1998.

TECHNICAL FIELD

The invention relates generally to autostereoscopic display systems and more particularly to an autostereoscopic display system that utilizes holographic optical elements.

DESCRIPTION OF THE RELATED ART

Conventional stereoscopic displays rely on a displayed scene that is made up of two slightly different perspective images of the same scene. When viewed using specifically designed colored filters or polarizing filters, the displayed scene will appear to be three-dimensional. In contrast, autostereoscopic displays do not require any special viewing aids.

An autostereoscopic display is typically comprised of an input image generator and a screen capable of producing viewing zones at a comfortable distance from the screen. The viewing zones are configured such that each eye of a viewer sees one of a stereo pair of slightly different perspective images, so that the scene displayed on the screen is viewed in a stereoscopic form.

Methods based on parallax barriers or lenticular lenses have been widely used for autostereoscopy. In the former, as long as the correct viewing geometry is maintained, the viewer can look through the grid with each eye seeing the correct left or right image. However, such displays have significant limitations. For example, if the viewer is incorrectly positioned, the right eye of the viewer can see the image intended for the left eye and vice versa. In addition, increasing the number of viewpoints requires grids with wider apertures and opaque bands, resulting in a severely reduced light transmission and a more conspicuous grid. These limitations may be alleviated by the use of lenticular screens, which comprise bands of cylindrical lenses with the image behind each lenticular element consisting of vertical stripes. This arrangement allows rays to be directed to predetermined regions of the viewing area. Lenticular screens also have the attribute of being able to provide multiple viewing zones. The central viewing zone gives the best image quality. The image quality deteriorates as the viewer moves away from the axis. The interfacing of lenticular (and parallax) screens to images presents severe registration problems, such as moire patterns.

The autostereoscopic methods described above require a composite input image, comprising alternate image strips for the left and right eyes. One way of increasing the effective viewing field is to create multiple simultaneous views. However, this imposes severe bandwidth requirements. An alternative approach is to track the position of the head and use an image steering system such that only two views need to be displayed simultaneously for a given viewer.

U.S. Pat. No. 4,799,739 to Newswanger describes a projection system that includes a holographically diffusing screen to provide an autostereoscopic display. The system of Newswanger further includes a number of projectors that generate and project images to the screen from different fixed locations. The holographically diffusing screen is a holographic optical element that has been configured to diffuse each projected image from one of the projectors to a discrete viewing zone. Thus, the number of viewing zones corresponds to the number of projectors included in the system. As long as each eye of a viewer is positioned in a viewing zone, a stereoscopic image can be observed by the viewer.

A concern with the holographically diffusing screen included in the system of Newswanger is that such a holographic optical element, in which several holograms are effectively recorded into a single optical element, would have a reduced diffraction efficiency for each separate hologram. In this type of holographic optical element, the diffraction efficiency scales as approximately divided by the square of the number of recorded holograms.

Although the conventional autostereoscopic display systems operate well for their intended purposes, what is needed is an autostereoscopic display system that can accommodate multiple viewers in a wide effective viewing field using a single image source.

SUMMARY OF THE INVENTION

An autostereoscopic display system and a method of displaying a scene in a stereoscopic form on a screen of the system include two or more reconfigurable holographic optical elements (HOEs) in the screen. The reconfigurable HOEs may be designed to perform simple optical functions that are commonly associated with traditional optical devices, such as those performed by lenses, prisms and mirrors. However, the reconfigurable HOEs are also designed to perform sophisticated optical manipulations, such as varying the light intensity with respect to a specific direction. Depending on the optical characteristics of the reconfigurable HOEs, the projection screen of the system may be designed for "reflective viewing," i.e., viewing from the side of the projection screen facing an image generator, or for "transmissive viewing," i.e., viewing from the side of the screen opposite to the image generator.

Each reconfigurable HOE includes a hologram that is sandwiched between two electrode layers. The hologram is a holographic photopolymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

In a first embodiment of the present invention, the system includes an image generator, projection optics and a projection screen having two stacks of reconfigurable HOEs. A first reconfigurable HOE stack of the screen is designed to diffuse images projected from the image generator to a first diffusion zone. A second reconfigurable HOE stack is designed to diffuse the projected images to a second diffusion zone. The images manipulated by the first stack form a left perspective scene, while the images manipulated by the second stack form a right perspective scene. When an observer views the screen through the two diffusion zones, a stereoscopic scene can be seen by the observer.

The images projected from the image generator are sequences of monochromatic images that combine by means of binocular fusion to appear as a color scene to a person. A single perspective scene is presented by sequentially displaying three different monochromatic images of the tristimulus colors, i.e., red, green and blue. Therefore, both of the reconfigurable HOE stacks of the screen include three reconfigurable HOEs that are holographically configured to be distinguishable with respect to diffusing the monochromatic images of the three tristimulus colors. The reconfigurable HOEs of the stacks can then sequentially diffuse the different monochromatic images to display images on the screen. In operation, at any given time only a single reconfigurable HOE within the screen is set to the diffractive state to diffuse the currently projected monochromatic image. The other reconfigurable HOEs within the screen are set to the passive state, so that they do not optically manipulate the projected image. In this manner, each of the reconfigurable HOEs within the screen is sequentially set to the diffractive state to diffuse a chromatically corresponding image to one of the two viewing zones.

In a second embodiment of the invention, the projection screen includes four reconfigurable HOE stacks. Similar to the reconfigurable HOE stacks of the first embodiment, each of the four reconfigurable HOE stacks includes three reconfigurable HOE to diffuse monochromatic images projected from the image generator. Two of the four reconfigurable HOE stacks are holographically configured to diffuse the projected images to a first pair of viewing zones. The first pair of viewing zones allows a first observer to view a stereoscopic scene displayed on the screen. The other two reconfigurable HOE stacks of the screen are holographically configured to diffuse the projected images to a second pair of viewing zones. The second pair of viewing zones allows a second observer to view the same scene displayed on the screen in a stereoscopic form.

In an alternative arrangement, the system in accordance with the second embodiment operates to display different stereoscopic scenes to the two observers. This is accomplished by sequentially projecting images of a first stereoscopic scene and then sequentially projecting images of a second stereoscopic scene. The projected images of the first scene are diffused by the reconfigurable HOEs of the first stack to the first pair of viewing zones, while the projected images of the second scene are diffused by the reconfigurable HOEs of the second stack to the second pair of viewing zones. Therefore, each observer views only one of the two stereoscopic scenes through a pair of viewing zones associated with the position of that observer.

The system in accordance with the second embodiment can be modified to accommodate additional observers positioned at different locations. For each additional observer, the projection screen may be modified by including a pair of additional reconfigurable HOE stacks, such that the projected images are diffused to two new viewing zones associated with each location of an additional observer. The modified system may include one or more imaging devices to detect the presence of observers and to determine their locations, so that only images that will be directed to the viewing zones associated with the observers' locations are projected and diffused by the system.

In a third embodiment of the invention, the projection system is operatively configured to produce a wide field of view that is formed by a number of viewing zones. The viewing zones are supplied with different perspective images, such that one or more observers can experience parallax by looking at the projection screen through different pairs of viewing zones while moving along the wide field of view. In order to provide the viewing zones, the projection screen includes a corresponding number of reconfigurable HOE stacks. The reconfigurable HOE stacks are each holographically configured to diffuse projected images to a particular viewing zones. The exact number of reconfigurable HOE stacks within the screen is not critical to the invention. The system in accordance with the third embodiment may include one or more imaging devices, so that only images that will be directed to the viewing zones associated with the observers' locations are projected and diffused by the system. The imaging devices may also track movements of the observers to anticipate the viewing zones that will be visited by the observers, so that the reconfigurable HOE stacks associated with those viewing zones will be operational only when the observers are within or near the viewing zones.

An advantage of the system is that only a single image source, i.e., the image generator, is required to provide images to a large number of viewing regions. Another advantage is that the quality of the displayed stereoscopic scene is not dependent on the location of the viewing regions. In addition, the use of the reconfigurable HOEs allows the projection screen to be utilized in different applications.

DETAILED DESCRIPTION

Figure 1:
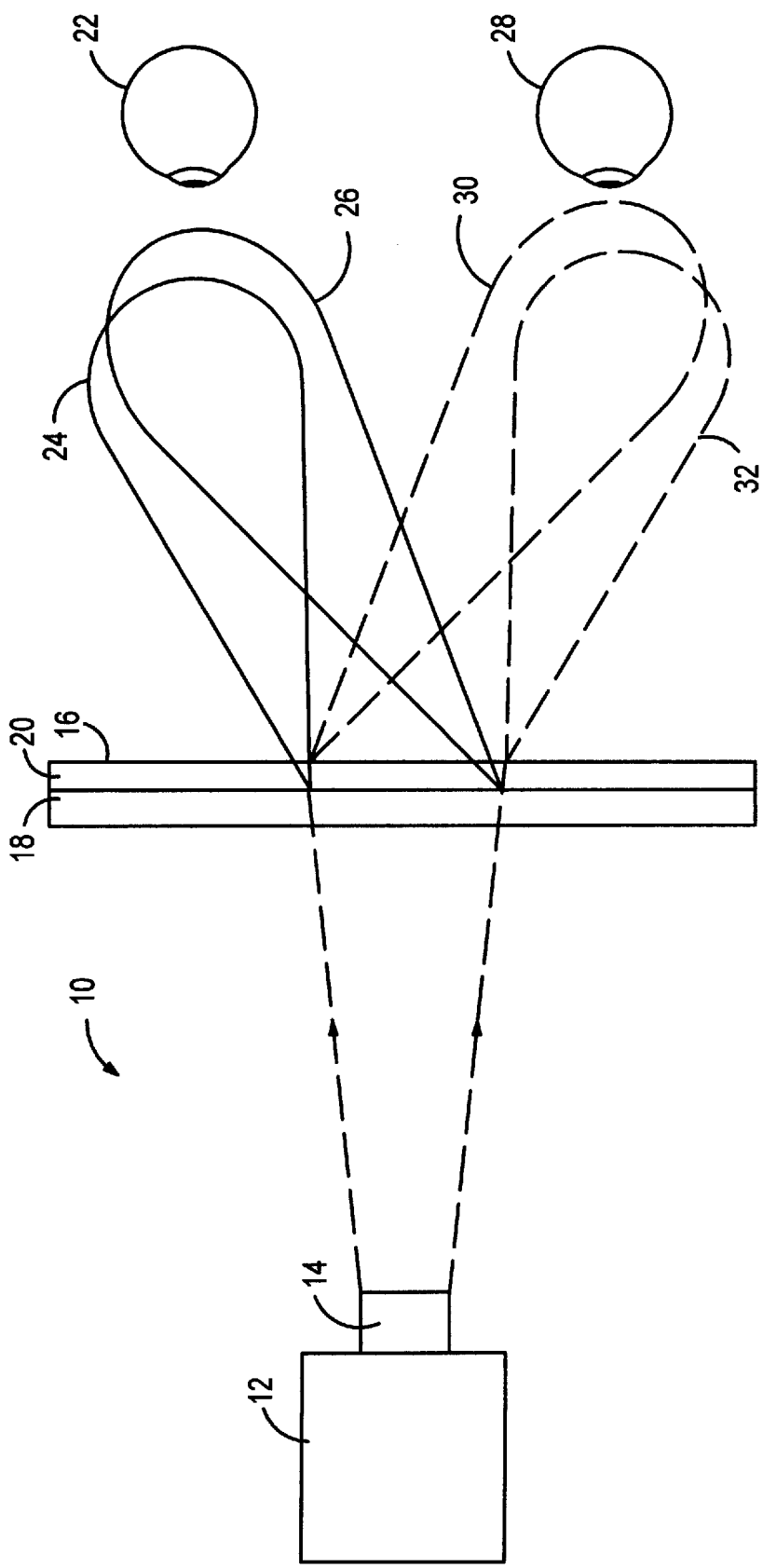
FIG. 1 is a schematic diagram of an autostereoscopic display system that includes a projection screen having reconfigurable holographic optical elements (HOEs) in accordance with a first embodiment of the invention.

With reference to FIG. 1, an autostereoscopic display system 10 in accordance with a first embodiment of the invention is shown. The display system includes an image generator 12, a projection optics 14 and a screen 16. The screen includes what will be referred to as "reconfigurable holographic optical elements" (HOEs). Similar to conventional HOEs, these reconfigurable HOEs can perform functions typically associated with traditional optical elements, as well as more sophisticated optical manipulations. However, the reconfigurable HOEs can alter their optical properties when an electrical field is applied.

The reconfigurable HOE includes a hologram that is sandwiched between two electrode layers. The hologram is preferably a Bragg-type hologram, having a high diffraction efficiency. The hologram is a holographic photopolymeric film that has been combined with liquid crystal. As an example, the photopolymeric film may be composed of a polymerizable monomer having dipentaerythritol hydroxypentacrylate, as described in PCT Application No. PCT/US97/12577 by Sutherland et al. The liquid crystal may be suffused into the pores of the photopolymeric film. The holographic fringes may be recorded into the photopolymeric film either prior to or after being combined with the liquid crystal. In the preferred embodiment, the photopolymeric material is combined with the liquid crystal prior to a recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the hologram can be accomplished by a traditional optical process in which interference fringes are created by applying beams of light. Alternatively, the interference fringes may be artificially created by using highly accurate laser writing devices or other optical replication techniques. The electrode layers that are adjacent to the hologram are made of a transparent conductive material. As an example, the electrode layers may be made of Indium Tin Oxide (ITO), which usually has a transmission efficiency of greater than 80%. An electrical field is generated within the hologram when a potential difference is applied to the layers.

The reconfigurable HOE has at least two optically operating states, a diffractive state and a passive state. The optical properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is created in the hologram by applying voltage to the electrode layers of the reconfigurable HOE, the optical state of the hologram switches from the diffractive state to the passive state.

The projection screen 16 includes two reconfigurable HOE stacks 18 and 20. Each stack contains three reconfigurable HOEs. The reconfigurable HOE stack 18 is designed to diffuse a right perspective image of a scene projected from the image generator 12, such that the right perspective image is directed toward a viewing region occupied by the right eye 22 of an observer, as illustrated by polar diagrams 24 and 26. However, the reconfigurable HOE stack 20 is designed to diffuse a left perspective image of the same scene projected from the image generator, such that the left perspective image is directed toward a viewing region occupied by the left eye 28 of the observer, as illustrated by polar diagrams 30 and 32. The reconfigurable HOE stacks operate in an alternating fashion to direct the right and left perspective images to the corresponding eyes of the observer. When the right and left perspective images are viewed by the observer, a stereoscopic view of the scene can be observed.

Figure 2:
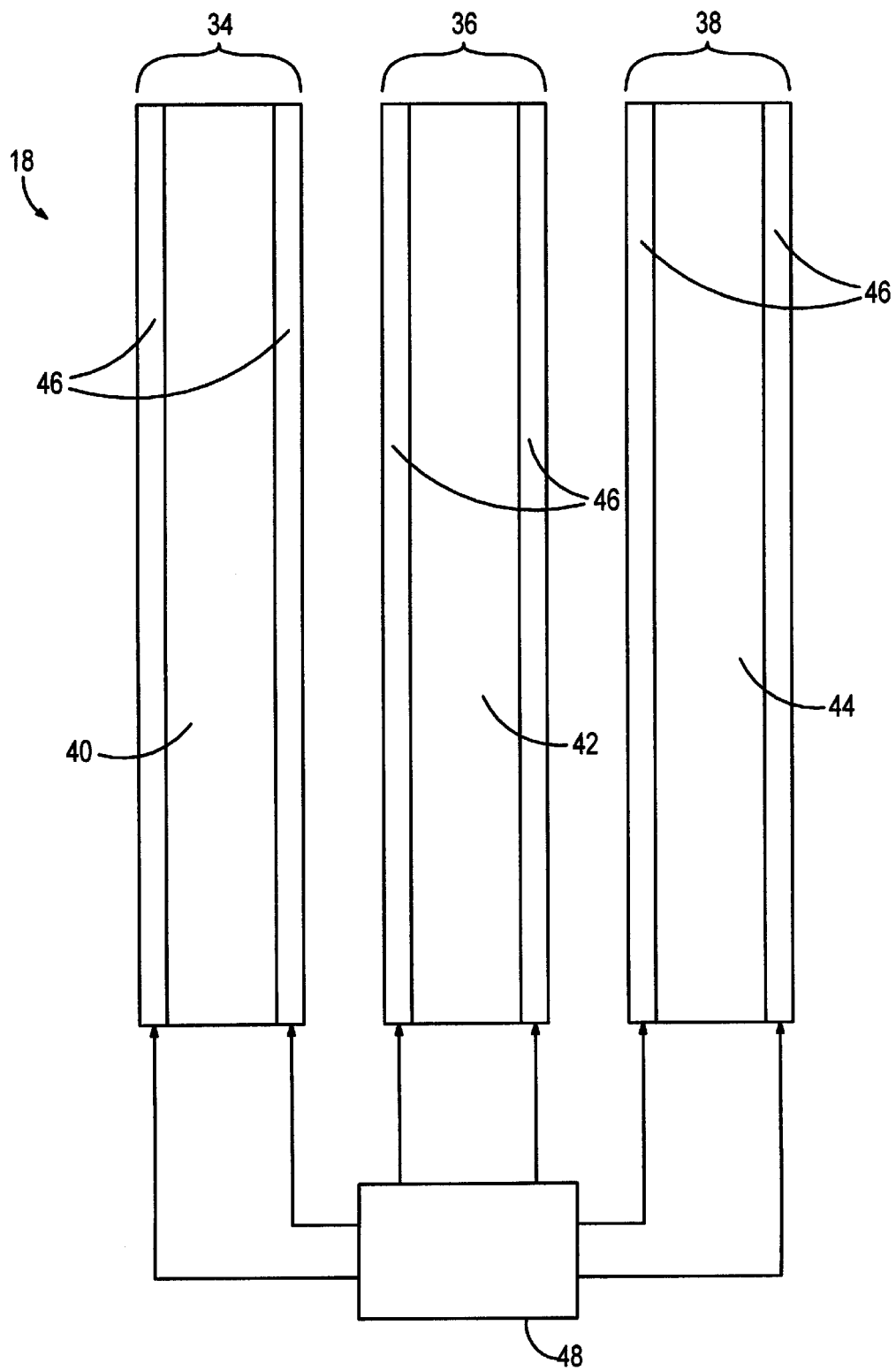
FIG. 2 is a schematic diagram of the components of a reconfigurable HOE stack in accordance with the invention.

Structurally, the stacks 18 and 20 are essentially identical, except for the interference fringes recorded in the reconfigurable HOEs of the stacks. Therefore, only the stack 18 will be described in detail. In FIG. 2, the components of the reconfigurable HOE stack 18 are shown. The stack 18 includes three reconfigurable HOEs 34, 36 and 38. The reconfigurable HOE 34 includes a hologram 40 that is sandwiched between two electrodes 46. Similarly, the reconfigurable HOE 36 includes a hologram 42 between a pair of electrodes 46, and the reconfigurable HOE 38 includes a hologram 44 between another pair of electrodes 46. Each hologram 40–44 is holographically configured to have a diffusing characteristic that results in the diffusion pattern, as illustrated by the polar diagrams 24 and 26 of FIG. 1. However, each hologram is also configured such that only a particular monochromatic light is diffused by the hologram. The hologram 40 is dedicated to operate on red light. The hologram 42 is configured to only operate on green light, while the hologram 44 is specific to blue light. The electrodes of the reconfigurable HOEs are individually coupled to a voltage controller 48. The voltage controller selectively provides an excitation signal to the electrodes of a selected reconfigurable HOE, switching the hologram of that reconfigurable HOE from the diffractive state to the passive state. The hologram in the passive state can then be switched to the diffractive state by removing the voltage to the electrodes.

Although not illustrated, the stack 20 also includes three reconfigurable HOEs that are each configured to diffuse a particular monochromatic light. The reconfigurable HOEs of the stack 20 may be coupled to the voltage controller 48, along with the reconfigurable HOEs of the stack 18. In an alternative arrangement, the reconfigurable HOEs of stack 20 may be coupled to a separate voltage controller. The only significant difference between the stacks 18 and 20 is that the reconfigurable HOEs of the stack 18 are holographically configured to produce a first diffusion pattern, as illustrated by the polar diagrams 24 and 26, while the reconfigurable HOEs of the stack 20 are configured to produce a second diffusion pattern, as illustrated by the polar diagrams 30 and 32.

In order to autostereoscopically display a color scene, the system 10 operates to sequentially display three right perspective monochromatic images of the scene and three left perspective monochromatic images of the same scene, with each monochromatic image corresponding to one of the tristimulus colors, i.e., red, green and blue. The monochromatic images are sequentially generated and projected to the projection screen 16 by the image generator 12. These monochromatic images are projected to the screen through the projection optics 14. The projection optics focuses and magnifies the projected monochromatic images, so that the images are focused and enlarged when viewed by the observer.

The projection screen 16 operates in conjunction with the image generator 12 to selectively diffuse the projected monochromatic images in one of the two diffusion patterns, so that the left images are directed to the left eye of the observer and the right images are directed to the right eye of the observer. When the right perspective images are generated and projected, the reconfigurable HOE stack 18 is selected to optically operate on these projected images. The unselected reconfigurable HOE stack 20 is set be optically passive to the projected images. Similarly, when the color set of left perspective images is generated and projected, the reconfigurable HOE stack 20 is selected to optically operate on these projected images and the reconfigurable HOE stack 18 is set to be optically passive.

When the right perspective images of a scene are being sequentially generated and projected by the image generator 12, the reconfigurable HOEs 34–38 of the stack 18 sequentially diffuse these projected images to the right eye 22 of the observer. In a cycle synchronized with the refresh rate of the image generator, the reconfigurable HOEs 34–38 of stack 18 are selectively and individually set to the diffractive state by the voltage controller 48. During a period when the image generator projects a red monochromatic image, the reconfigurable HOE 34 is set to the diffractive state to diffuse the image in the first diffusion pattern, as illustrated by the polar diagrams 24 and 26. The other reconfigurable HOEs 36 and 38 are set to the passive state. During a period when the image generator projects a green monochromatic image, the reconfigurable HOE 36 is set to the diffractive state to diffuse the green image in the diffusion pattern, while the reconfigurable HOEs 34 and 38 are set to the passive state. Similarly, during a period when the image generator projects a blue monochromatic image, the reconfigurable HOE 38 is set to the diffractive state to diffuse the blue image in the first diffusion pattern, while the reconfigurable HOEs 34 and 36 are set to the passive state. The order in which the monochromatic images are projected and diffused is not critical to the invention. With a sufficient refresh rate, the sequential diffusion of the right perspective monochromatic images produces a color composite image of the right perspective scene.

In a similar manner, the left perspective monochromatic images of the same scene are sequentially diffused by the reconfigurable HOE stack 20 to the left eye 28 of the observer. The sequential diffusion of the left perspective images displays a composite color image of the left perspective scene to the left eye. Although the right and left perspective color scenes are viewed consecutively, the left and right scenes will appear to be simultaneously displayed on the screen 16, if the left and right scenes are displayed with sufficient speed. This is a direct result of binocular fusion, in which the left and right eye images are fused during an eye integration time. When the left and right perspective scenes are viewed "simultaneously," the observer will view a stereoscopic display of the color scene.

Figure 3:
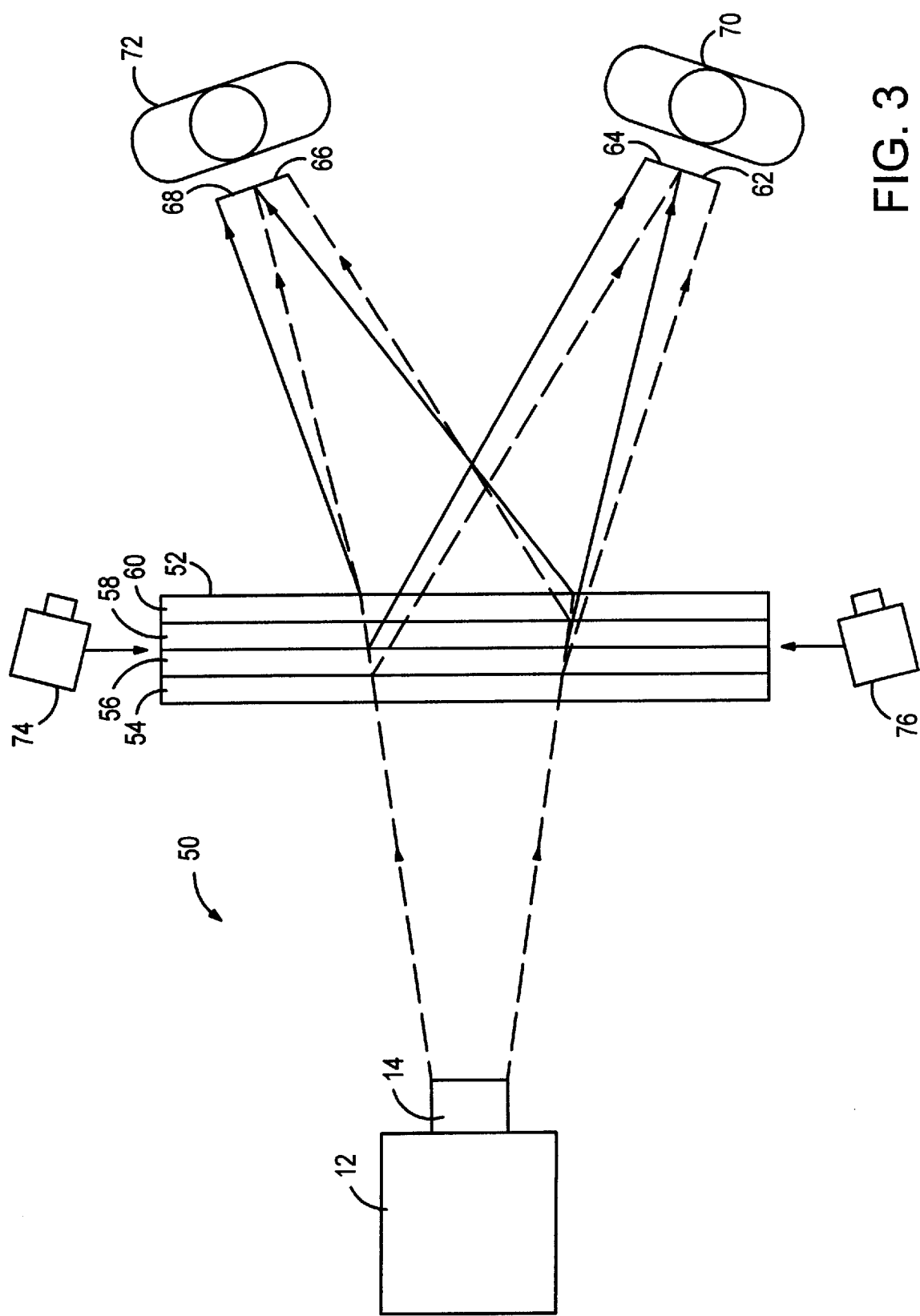
FIG. 3 is a schematic diagram of an autostereoscopic display system in accordance with a second embodiment of the invention.

Turning to FIG. 3, an autostereoscopic display system 50 in accordance with a second embodiment is shown. The same reference numerals of FIG. 1 will be used for the same components illustrated in FIG. 3. The system includes the image generator 12, the projection optics 14 and a screen 52. The screen contains reconfigurable HOE stacks 54, 56, 58 and 60. Similar to the stacks 18 and 20 of the screen 16 in FIG. 1, each of the stacks 54–60 is composed of three reconfigurable HOEs that are holographically configured to be wavelength selective to diffuse monochromatic images of a particular tristimulus color projected from the image generator 12.

The reconfigurable HOE stacks 54–60 are designed to diffuse the projected images to viewing zones 62, 64, 66 and 68. The reconfigurable HOE stack 54 is holographically configured to diffuse the projected images to the viewing zone 62. Similarly, the reconfigurable HOE stacks 56–60 are configured to diffuse the projected images to the viewing zones 64–68, respectively. The viewing zones 62 and 64 allow an observer 70 to stereoscopically view a scene displayed on the screen 52, while the viewing zones 66 and 68 allow an observer 72 to stereoscopically view the same scene displayed on the screen.

With respect to the mode of operation, the reconfigurable HOE stacks 54–60 of the projection screen 52 operate in pairs to direct the projected images to the observers 70 and 72. Therefore, the reconfigurable HOEs 54–60 will be described in pairs. The reconfigurable HOE stacks 54 and 56 constitute a first pair, while the stacks 58 and 60 constitute a second pair. Each pair of stacks 54–60 operates in the same manner as the reconfigurable HOE stacks 18 and 20 of the projection screen 16 in FIG. 1 to display a color image in a stereoscopic form to one of the observers. However, the first and second pairs of stacks 54–60 operate on images projected from the image generator 12 in an alternating fashion to present the projected images to both observers. For example, in a first time period, the first pair of stacks may be initially set to an active state to operate on the projected images to present right and left perspective color images of a scene to the observer 70. During this first time period, the second pair of stacks is set to be optically passive to the projected images. In a second time period, the second pair of stacks is set to the active state to operate on the projected images to present right and left perspective color images of the same scene to the observer 72. During this period, the first pair of stacks is set to be optically passive to the projected images. This cycle is repeated to display the next scene to both observers in a stereoscopic form.

In a modified operation, different stereoscopic scenes may be presented to the observers 70 and 72. In this modified operation, the first and second pairs of stacks 54–60 optically manipulate the projected images in the same manner as described above. However, the image generator 12 generates and projects images of a particular scene in synchronization with the operating states of the first and second pairs of stacks. When the first pair of stacks 54 and 56 is in the active state, the image generator projects images that correspond to a first scene. These images are diffused by the stacks 54 and 56 toward the observer 70. When the second pair of stacks 58 and 60 is in the active state, the image generator projects images that correspond to a second scene. The images of the second scene are diffused by the stacks 58 and 60 toward the observer 72. In this manner, a different scene can be presented to each of the observers.

Although the system 50 is designed to display images to only two observers 70 and 72, the system may be modified to accommodate more than two observers. For each additional observer, the screen 52 may be modified by further including a pair of reconfigurable HOE stacks. The reconfigurable HOE stacks of the added pair would be holographically configured to diffuse projected images toward a pair of new viewing zones to allow the additional observer to view a stereoscopic display of a scene. The scene viewed by the additional observer may be the same scene viewed by the observers 70 and 72 or a completely different scene.

The number of observers that can be accommodated by the system 50 is theoretically unlimited. However, there are practical limitations to the number of observers who can be accommodated by the system. In particular, since the number of monochromatic images that need to be sequentially generated and projected increases as the number of accommodated observers is increased, the maximum refresh rate of the image generator 12 limits the number of observers who can be accommodated by the system. In addition, the maximum switching rate of the reconfigurable HOEs in the screen 52 also limits the number of observers, since the switching rate must be synchronized with the refresh rate of the image generator.

One way to overcome the limitation caused by these rates is to decrease the number of images that need to generated, projected and diffused by the system 50. The number of required images can be decreased by generating, projecting and diffusing only the images that are necessary to present the images to the actual observers who are positioned in the viewing zones. For example, if the system is designed to accommodate ten potential observers, the projection screen 52 needs to have ten pairs of reconfigurable HOE stacks. Ten pairs of stacks equate to twenty viewing zones, two zones for each observer to view left and right perspective scenes. The number of images that are required to present an autostereoscopic scene to all the viewing zones equals sixty monochromatic images. However, if there are only two observers who are actually viewing the screen through four viewing zones, the diffused images to the other viewing zones are unnecessary. Therefore, only the images that will be directed to the four viewing zones being utilized need to be generated, projected and diffused by the system. In addition, only the two pairs of reconfigurable HOE stacks that are associated with the four viewing zones being utilized need to be in the active state. Consequently, the required refresh rate of the image generator 12 and the switching rate of the reconfigurable HOEs can be maintained below the maximum rates.

The presence and locations of observers can be determined by utilizing one or more imaging devices, such as imaging devices 74 and 76. The imaging devices 74 and 76 may be digital cameras or other conventional devices that capture image information of observers who are positioned in the vicinity of the projection screen 52. The image information is processed to determine the locations of the observers using known image processing methods. Then, the reconfigurable HOE stacks that can direct projected images toward the viewing zones associated with the locations of the observers are selected to operate on the projected images. Only the images that will be presented to the observers are generated and projected by the image generator 12. For example, if only the observer 70 is positioned to view the screen 52, the imaging devices 74 and/or 76 determine(s) the location of the observer 70. Since the observer 70 is positioned to view through the viewing zones 62 and 64, the reconfigurable HOE stacks 54 and 56 are selected to operate on the projected images. The unselected reconfigurable HOE stacks 58 and 60 are set to the passive state. In operation, the image generator 12 generates and projects only the images that will be diffused to the viewing zones 62 and 64 by the reconfigurable HOE stacks 54 and 56. Although the use of imaging devices is preferred, other location determining devices may instead be utilized, such as a radio-frequency radar device.

Figure 4:
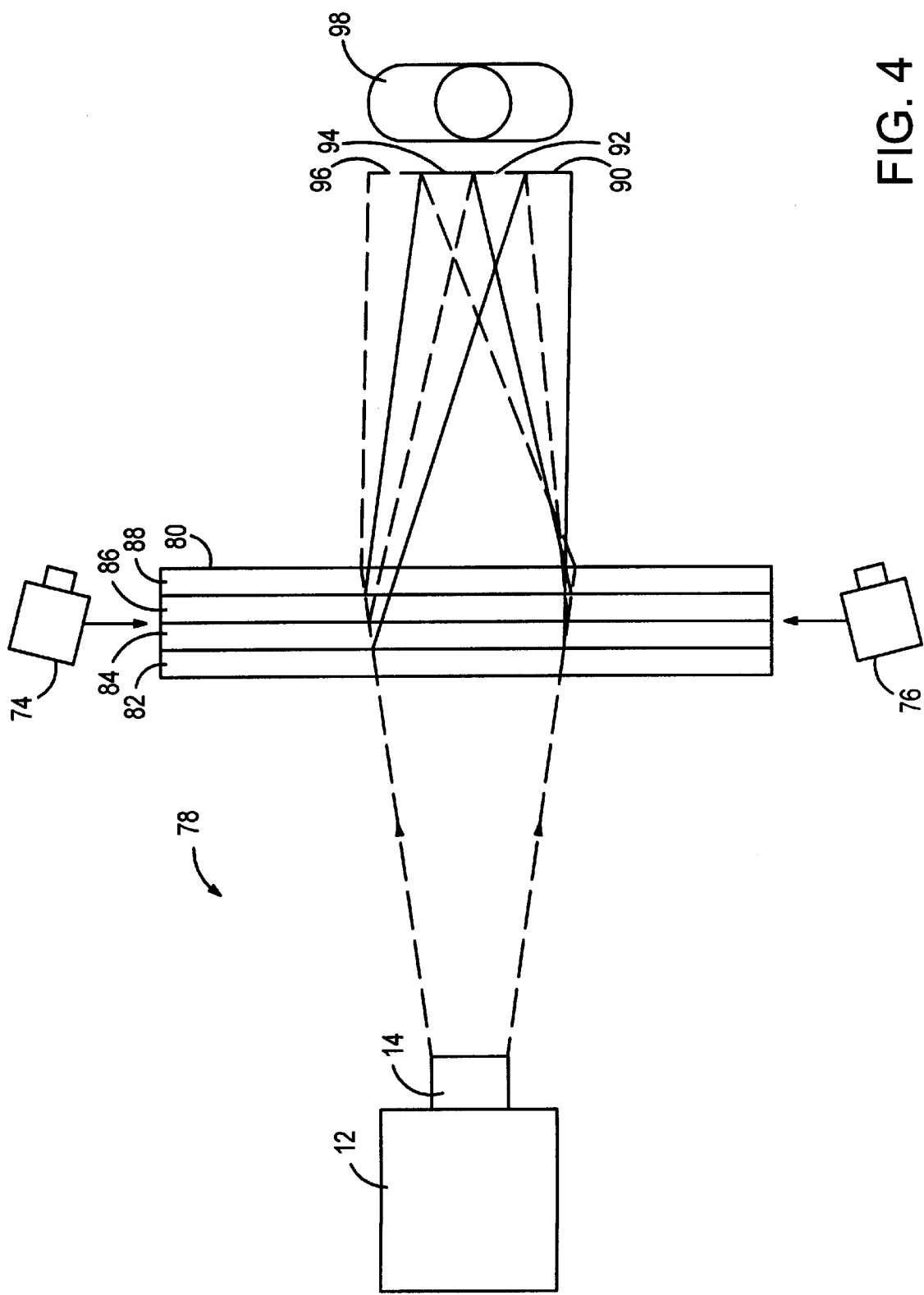
FIG. 4 is a schematic diagram of an autostereoscopic display system in accordance with a third embodiment of the invention.

Turning now to FIG. 4, an autostereoscopic display system 78 in accordance with a third embodiment of the invention is shown. The same reference numerals of FIGS. 1 and 3 will be used for the same components illustrated in FIG. 4. The system includes the image generator 12, the projection optics 14, and a screen 80. The screen contains reconfigurable HOE stacks 82, 84, 86 and 88. Similar to the previously described reconfigurable HOEs stacks, each of the stacks 82-88 is composed of three reconfigurable HOEs that are holographically configured to be wavelength selective to diffuse monochromatic images of a particular tristimulus color projected from the image generator 12.

The reconfigurable HOE stacks 82–88 are designed to diffuse the projected images to viewing zones 90, 92, 94 and 96. The reconfigurable HOE stack 82 is holographically configured to diffuse the projected images to the viewing zone 90. Similarly, the reconfigurable HOE stacks 84–88 are configured to diffuse the projected images to the viewing zone 92–96, respectively. The viewing zones 90–96 allow an observer 98 to stereoscopically view a scene displayed on the screen 80 by selectively presenting right and left perspective images of the scene to the eyes of the observer through two adjacent viewing zones. In FIG. 4, the observer 98 is positioned to view the stereoscopic scene displayed on the screen through the viewing zones 92 and 94. For a given stereoscopic scene, the right perspective images are presented to the right eye of the observer by the reconfigurable HOE stack 86 through the viewing zone 94, while the left perspective images are presented to the left eye of the observer by the reconfigurable HOE stack 84 through the viewing zone 92.

In operation, the image generator 12 sequentially generates and projects two consecutive color sets of monochromatic images to the screen 80. Each color set of monochromatic images forms a composite image of a right or left perspective scene that is directed to one of the viewing zones 90–96. In synchronization with the projecting sequence of the color sets of images, the reconfigurable HOE stacks 82–88 are sequentially selected to operate on the projected color sets of images. The observer 98 is positioned to view the right and left perspective scenes through the viewing zones 92 and 94, thereby observing a first stereoscopic scene created from the stereo pair of perspective scenes. However, the observer can experience parallax by moving to the left or the right. If the observer moves to the right, the observer will see a second stereoscopic scene of a slightly different perspective created from the perspective scenes directed to the viewing zones 94 and 96. On the other hand, if the observer moves to the left, the observer will see a third stereoscopic scene created from the perspective scenes directed to the viewing zones 90 and 92.

Although the projection screen 80 is shown to include only the four reconfigurable HOE stacks 82–88, the screen may include additional reconfigurable HOE stacks, thereby increasing the number of viewing zones. The increase in the number of viewing zones also increases the viewing field of the screen. However, the number of viewing zones and the number of reconfigurable HOE stacks that can be operatively included in the screen are again limited to the refresh rate of the image generator 12 and the switching rate of the reconfigurable HOEs in the screen.

One way to resolve this limitation is to include one or more imaging devices, such as the imaging devices 74 and 76. The imaging devices 74 and 76 can operate to capture images of the observer 98 to determine the location of the observer. The observer's location is then utilized by the screen 80 to select two reconfigurable HOE stacks in the screen to actively operate on projected images, so as to present different right and left perspective scenes to the viewing zones that correspond to the location of the observer. For example, if the screen 80 includes a significant number of reconfigurable HOE stacks, only the reconfigurable HOE stacks 84 and 86 of the screen may be selected to present right and left perspective scenes to the viewing zones 92 and 94.

The imaging devices 74 and 76 may be further utilized to track the observer 98, as the observer moves within the viewing field of the screen 80. The tracking of the observer allows the system 78 to adjust to the movement of the observer, so that the moving observer can consistently view the image displayed on the screen. In the previously example, if the observer 98 moves to the right, the imaging devices 74 and 76 will track the movement of the observer. Before the observer moves into the position to view the screen through the viewing zones 94 and 96, the reconfigurable HOE stack 88 is selected to diffuse projected images to the viewing zone 96. In addition, the image generator 12 generates and projects images that are to be directed to the viewing zone 96. Thus, as the observer moves to the viewing zones 94 and 96, the system adjusts to the movement of the observer by presenting images to the viewing zones 94 and 96. The generation and diffusion of the images associated with the viewing zone 92 can be terminated when the observer has moved sufficiently to view through only the viewing zones 94 and 96.

The locating-and-tracking feature of the system 78 can be expanded to accommodate more than one observer. For example, if two observers are present, the system can present images to four viewing zones, two for each observer. As the observers move about, the imaging devices 74 and 76 track their movements. The tracking information is then utilized by the image generator 12 and the projection screen 80 to selectively generate, project and diffuse images to appropriate viewing zones in response to the observers' movement. Although two viewing zones per observer may be sufficient, the number of active viewing zones per observer may be increased to ensure that the observers will consistently view left and right perspective scenes. For example, four viewing zones may be operating for a given observer.

Figure 5:
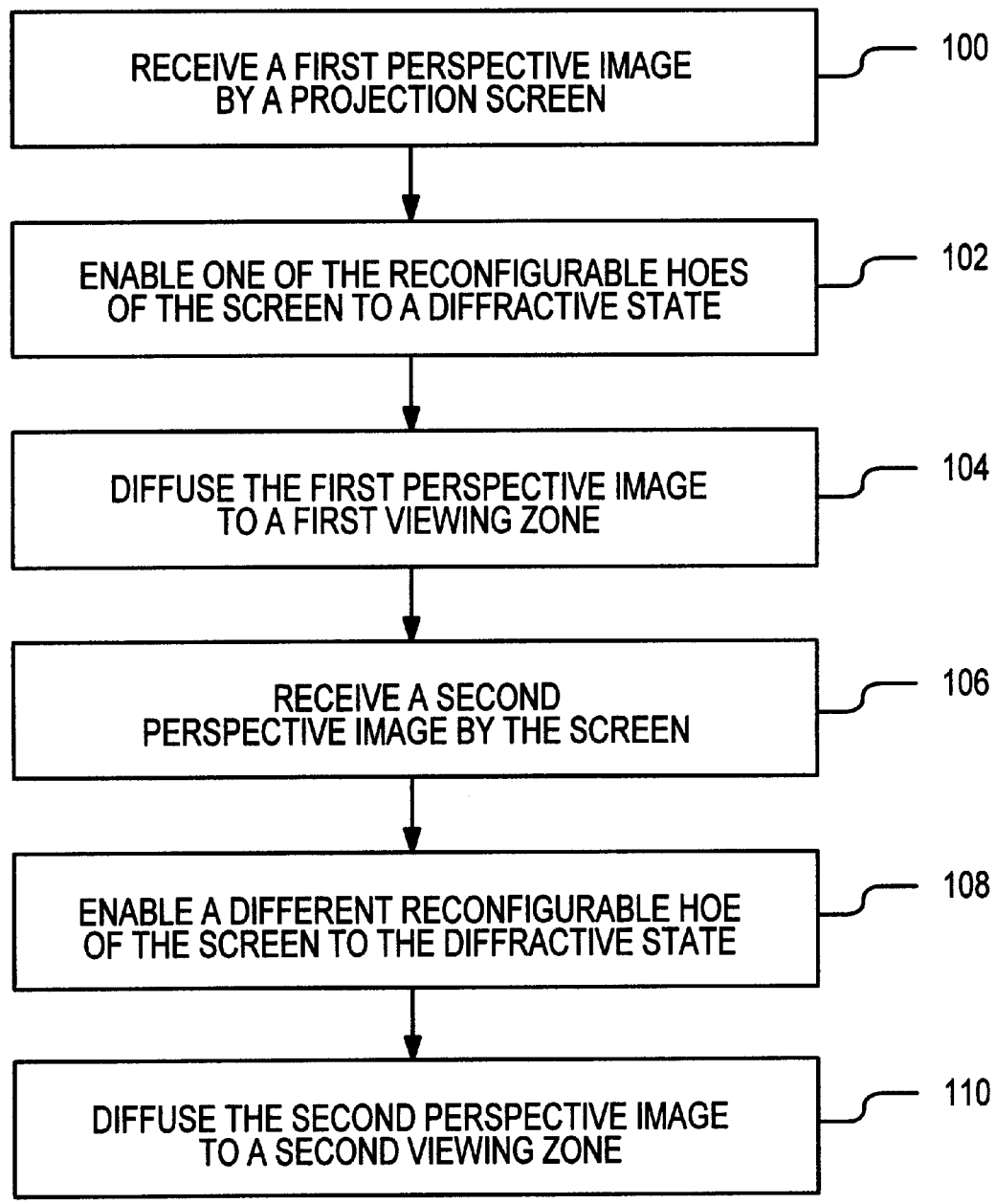
FIG. 5 is a flow diagram of a method of autostereoscopically displaying a scene in accordance with the invention.

A method of autostereoscopically displaying a scene on a projection screen in accordance with the invention will be described with reference to FIG. 5. At step 100, a first perspective image of a scene is received by the screen. As an example, the first perspective image may be a left perspective image. At step 102, one of the reconfigurable HOEs of the screen is selectively enable and 10 the diffractive state. The order of steps 100 and 102 is not critical to the invention. The other reconfigurable HOEs of the screen are switched to the passive state. At step 104, the first perspective image is diffused by the enabled reconfigurable HOE to a first viewing zone. Steps 100–104 are then essentially repeated. At step 106, a second perspective image of the scene is received by the screen. If the first perspective image was a left perspective image, the second perspective image will be a right perspective image of the scene. At step 108, a different reconfigurable HOE of the screen is selectively enabled to a diffractive state. The other reconfigurable HOEs of the screen are again switched to the passive state. Similar to steps 100 and 102, the order of steps 106 and 108 is not critical to the invention. At step 110, the second perspective image is diffused by the enabled reconfigurable HOE to a second viewing zone. The first and second perspective images allow a stereoscopic view of the scene to be observed when the screen is viewed through the first and second viewing zones. The perspective images received and diffused by the screen are monochromatic images. In order to display a color scene, three perspective images that correspond to the three tristimulus colors are sequentially received and diffused by the screen to the first and second viewing zones.

What is claimed is:

1. An autostereoscopic display system comprising:

image-generating means for projecting left and right perspective images of a scene in a predetermined direction; and display means positioned relative to said image-generating means to receive said left and right perspective images for selectively diffusing said left and right perspective images to first and second viewing regions, said display means including first and second reconfigurable holographic optical elements, each of said first and second reconfigurable holographic optical elements having a diffusing characteristic that is responsive to an applied electrical field, said display means having a surface to display said scene in a stereoscopic form when viewed through said first and second viewing regions.

2. The system of claim 1 wherein said first and second reconfigurable holographic optical elements are holographically configured to optically manipulate monochromatic light such that said scene is monochromatically displayed on said display means.

3. The system of claim 2 wherein said first reconfigurable holographic optical element is one member of a first set of three reconfigurable holographic optical elements and wherein said second reconfigurable holographic optical element is one member of a second set of three reconfigurable holographic optical elements, each of said reconfigurable holographic optical elements being holographically configured to optically manipulate one of tristimulus color lights when in said diffractive state to display a color scene on said display means.

4. The system of claim 1 further comprising a voltage controller electrically coupled to said first and second reconfigurable holographic optical elements to selectively provide voltage to said reconfigurable holographic optical elements, said voltage provided by said voltage controller being sufficient to generate said applied electrical field.

5. The system of claim 1 wherein said display means further includes third and fourth reconfigurable holographic optical elements, said third reconfigurable holographic optical element having a diffusing characteristic to diffuse said left perspective image to a third viewing region when in a diffractive state, said fourth reconfigurable holographic optical element having a diffusing characteristic to diffuse said right perspective image to a fourth viewing region when in said diffractive state.

6. The system of claim 5 wherein said image-generating means is configured to project images of a first scene only when said first and second reconfigurable holographic optical elements of said display means are in an active mode and to project images of a second scene only when said third and fourth reconfigurable holographic optical elements are in said active mode.

7. The system of claim 5 further comprising a detecting means for determining a position of an observer within a predefined vicinity of said display means, said detecting means being operatively associated with said display means such that at least two of said reconfigurable holographic optical elements are selectively set to said active mode in response to determination of said position.

8. The system of claim 7 wherein said detecting means is an imaging device that captures an image of said observer to determine said position of said observer.

9. The system of claim 8 wherein said imaging device is configured to capture a plurality of images of said observer, said plurality of images being used to track changes in said position of said observer, said changes in said position being utilized by said display means to selectively switch at least two of said reconfigurable holographic optical elements to said active mode in anticipation of continued changes in said position of said observer.

10. A method of autostereoscopically displaying scenes on a projection screen comprising steps of:

receiving left and right perspective images of a first scene by said projection screen; and selectively diffusing said left and right perspective images to first and second viewing regions, including transmitting said left and right perspective images through first and second reconfigurable holographic optical elements, each of said first and second reconfigurable holographic optical elements having a diffusing characteristic that is controllable by an applied electrical field, said left and right perspective images providing a stereoscopic view of said first scene when said projection screen is viewed through said first and second viewing regions.

11. The method of claim 10 further comprising steps of:

receiving left and right perspective images of a second scene by said projection screen; and selectively diffusing said left and right perspective images of said second scene to third and fourth viewing regions, including transmitting said images of said second scene through third and fourth reconfigurable holographic optical elements, each of said third and fourth reconfigurable holographic optical elements having a diffusing characteristic that is controllable by an applied electrical field, said left and right perspective images of said second scene providing a stereoscopic view of said second scene when said projection screen is viewed through said third and fourth viewing regions.

12. The method of claim 10 further comprising a step of selectively diffusing said left and right images of said first scene to third and fourth viewing regions, including transmitting said images of said first scene through third and fourth reconfigurable holographic optical elements, each of said third and fourth reconfigurable holographic optical elements having a diffusing characteristic that is controllable by an applied electrical field, said first scene configured for viewing in a stereoscopic form when viewed through any two adjacent viewing regions.

13. The method of claim 10 further comprising step of:
providing a plurality of reconfigurable holographic optical elements which are dedicated to an array of different viewing regions, said plurality including said first and second reconfigurable holographic optical elements;
determining a position of an observer; and
enabling only said first and second reconfigurable holographic optical elements from said plurality of reconfigurable holographic optical elements to a diffractive state in response to determination of said position of said observer, thereby diffusing said left and right perspective images of said first scene to said first and second viewing regions, wherein said position of said observer is generally aligned with said first and second viewing regions such that said observer is positioned to view said projection screen through said first and second viewing regions.

14. The method of claim 13 wherein said step of determining said position of said observer includes capturing an image of said observer to calculate said position of said observer.

15. The method of claim 13 wherein said step of determining said position of said observer includes tracking movement of said observer by capturing a sequence of images of said observer during said movement to anticipate a future position of said observer.

16. An autostereoscopic display system comprising:
image-generating means for projecting different perspective images in a predetermined direction; and
a display screen optically coupled to said image-generating means to receive said images projected from said image-generating means, said display screen including a plurality of reconfigurable holographic optical elements to selectively diffuse said images to a plurality of viewing regions, each of said reconfigurable holographic optical elements having a controllable diffusing characteristic that is responsive to an applied electrical field to selectively diffuse said images to a corresponding viewing region such that a stereoscopic image formed by two of said images is observed when said display screen is viewed through a pair of said viewing regions.

17. The system of claim 16 wherein each of said reconfigurable holographic optical elements is holographically configured to diffuse said images of a particular tristimulus color.

18. The system of claim 16 further comprising a detecting means operatively coupled to said plurality of said reconfigurable holographic optical elements for determining a relative position of an observer with respect to said viewing regions.

19. The system of claim 18 further comprising a supplying means for providing voltage to at least two selected reconfigurable holographic optical elements to generate said applied electrical field, said supplying means being operatively associated with said detecting means to provide said voltage to said selected reconfigurable holographic optical elements in response to determination of said relative position of said observer.

20. The system of claim 16 wherein said plurality of said reconfigurable holographic optical elements includes first and second pairs of said reconfigurable holographic optical elements, said first pair of said reconfigurable holographic optical elements being holographically configured to diffuse at least two of said images to a first stereo pair of adjacent viewing regions to display a first stereoscopic scene on said display screen when viewed through said first stereo pair of said adjacent viewing regions, said second pair of said reconfigurable holographic optical elements being holographically configured to diffuse at least two of said images to a second stereo pair of adjacent viewing regions to display a second stereoscopic scene on said display screen when viewed through said second stereo pair of said adjacent viewing regions.

* * * * *